United States Patent
Kobayashi et al.

(10) Patent No.: US 7,220,493 B2
(45) Date of Patent: May 22, 2007

(54) LEAD-FREE SOLDER, AND A LEAD-FREE JOINT

(75) Inventors: Satoru Kobayashi, Komagane (JP);
Kazuyuki Kato, Nagano (JP);
Masahiro Sugiura, Matsuyama (JP);
Saburo Okabe, Tokyo (JP)

(73) Assignees: Koa Kabushiki Kaisha, Ina-shi (JP);
Soldercoat Co., Ltd., Nagoya (JP);
Okabe Giken Co., Ltd., Shinagawa-ku (JP)

( * ) Notice: Subject to any disclaimer, the term of this patent is extended or adjusted under 35 U.S.C. 154(b) by 0 days.

(21) Appl. No.: 10/532,004

(22) PCT Filed: Oct. 23, 2003

(86) PCT No.: PCT/JP03/13511

§ 371 (c)(1),
(2), (4) Date: Oct. 28, 2005

(87) PCT Pub. No.: WO2004/038053

PCT Pub. Date: May 6, 2004

(65) Prior Publication Data

US 2006/0104854 A1    May 18, 2006

(30) Foreign Application Priority Data

Oct. 24, 2002   (JP)   .............................. 2002-309549

(51) Int. Cl.
*B32B 15/00*   (2006.01)
*B32B 15/01*   (2006.01)
*B23K 35/22*   (2006.01)
*C22C 13/00*   (2006.01)
*C22C 18/00*   (2006.01)

(52) U.S. Cl. ...................... 428/646; 428/658; 420/557; 420/524; 228/56.3

(58) Field of Classification Search ...................... None
See application file for complete search history.

(56) References Cited

U.S. PATENT DOCUMENTS 2,864,733 A * 12/1958 Kranich ...................... 420/560

(Continued)

FOREIGN PATENT DOCUMENTS

DE       100 45 991 A     4/2002

(Continued)

OTHER PUBLICATIONS

"Binary Alloy Phase Diagrams", Second Edition, p. 3417, vol. 3, ASM International, The Materials Information Society, USA.

(Continued)

Primary Examiner—John J. Zimmerman
Assistant Examiner—Jason L. Savage
(74) Attorney, Agent, or Firm—Smith Patent Office

(57) ABSTRACT

A solder not containing lead (a lead-free solder) contains zinc and tin, and also contains 5 weight percent or less nickel and 0.5 weight percent or less aluminum with a liquid phase temperature of 260 degrees C. or greater. In addition, a lead-free solder has a liquid phase temperature of 260 degrees C. or greater, and contains 30 to 70 weight percent zinc, 5 weight percent or less nickel, and the remaining weight percent tin. Moreover, a joint is manufactured using these lead-free solders. As a result, a lead-free solder and a lead-free joint having excellent electrical characteristics but not including harmful substances, can be provided.

2 Claims, 2 Drawing Sheets

U.S. PATENT DOCUMENTS

| | | | |
|---|---|---|---|
| 5,429,882 A | 7/1995 | Carey, II et al. | |
| 5,942,185 A * | 8/1999 | Nakatsuka et al. | 420/562 |
| 6,280,858 B1 * | 8/2001 | Teshima | 428/639 |
| 6,673,310 B2 * | 1/2004 | Tadauchi et al. | 420/557 |
| 6,840,434 B2 * | 1/2005 | Clay et al. | 228/223 |
| 2004/0091385 A1 | 5/2004 | Leyendecker et al. | |

FOREIGN PATENT DOCUMENTS

| | | | |
|---|---|---|---|
| JP | 55-65341 A | | 5/1980 |
| JP | 56-69341 A | | 6/1981 |
| JP | 6-79494 A | | 3/1994 |
| JP | 6-256922 A | | 9/1994 |
| JP | 7-96386 A | | 4/1995 |
| JP | 11-172352 A | | 6/1999 |
| JP | 11-172353 A | | 6/1999 |
| JP | 2000-15478 A | | 1/2000 |
| JP | 2001-121285 A | | 5/2001 |
| JP | 2001-321983 | * | 11/2001 |
| JP | 2003-126988 | * | 5/2003 |

OTHER PUBLICATIONS

Brorson et al., "Overview of Solders and Brazes with Reduced Environmental Loading", 1996, p. 37, AFR Report, Swedish Environmental Protection Agency, Stockholm, Sweden.

* cited by examiner

LEAD-FREE SOLDER, AND A LEAD-FREE JOINT

TECHNICAL FIELD

The present invention relates to a solder not containing lead (a lead-free solder) and a joint not containing lead (a lead-free joint), which are suitable for electronic devices or electronic components, for example.

BACKGROUND ART

Soldering has been conventionally performed for mounting an electronic component upon a printed circuit board, or electrically connecting an internal element or the like of the electronic component that is mounted upon the printed circuit board. A typically utilized solder is an eutectic solder of tin and lead, and when actually mounting an electronic component upon the printed circuit board, soldering is performed at a maximum temperature of 260° C. using a tin-lead eutectic solder with a melting point of 183° C.

Soldering for electrically connecting an electrode and an element or the like included in an electronic component that is mounted upon the printed circuit board requires maintaining a stable connection, even at the above-mentioned temperature for performing soldering on a mounting board. Consequently, a high temperature solder with a melting point of at least 260° C. must be used for internally soldering the electronic component so that the joints do not come off even under such conditions. Furthermore, a high temperature solder with little characteristic changes under high temperatures is also in demand.

Solder material of 90 wt % lead and 10 wt % tin with a solid phase temperature of 268° C. and a liquid phase temperature of 301° C., or solder material of 90.5 wt % lead, 8 wt % tin and 1.5 wt % silver with a solid phase temperature of 277° C. and a liquid phase temperature of 290° C., or the like is typically used as the high temperature solder, where these solders raise the melting point by using large quantities of lead.

Incidentally, from the viewpoint of technical simplicity, reliability and the like, soldering is essential in the manufacture and assembly of electronic devices. On the other hand, since the solder includes lead, which is harmful to the human body, the health effects for the workers at the fabricating site of the solder itself, and at manufacturing sites that utilize that solder for soldering devices or the like cannot be overlooked. At the same time, in the light of current conditions where a great deal of electrical devices that are no longer in use are disposed, environmental problems arising due to the lead-containing solder utilized for such waste products are feared.

Consequently, recycling waste products and manufacturing methods not using harmful substances are proposed. Removal of harmful substances is desired from the viewpoint of preventing environmental pollution, where joining techniques using solder is not an exception. Materialization of a high temperature solder not containing lead, which is a harmful substance, is in demand by the electronic device industry and the like.

Various techniques relating to solder not containing lead, namely lead-free have been previously proposed. For example, techniques relating to solder that is preferable for joining fittings and inner wires of control cables for brakes, clutches and the like of automobiles and motorcycles by adding tin, zinc, and silver are mentioned in Laid-open Japanese Patent Application No. 55-65341. Furthermore, techniques heightening joint strength by further adding copper are mentioned in Laid-open Japanese Patent Application No. 56-69341.

In Laid-open Japanese Patent Application No. 11-172352, techniques are mentioned where with zinc as the main material, aluminum, magnesium and gallium are added. Laid-open Japanese Patent Application No.11-172363 discloses techniques where with zinc as the main material, aluminum and germanium are added, and tin and/or indium are also added. Furthermore, solder having a composition of zinc, a material with higher vapor pressure than that of zinc, and tin is mentioned in Laid-open Japanese Patent Application No. 2000-15478.

Incidentally, copper material is typically used as material configuring electronic devices and electronic components, however when using solder containing zinc for soldering such copper material, there are cases where an intermetallic compound generates at the joint interface of the solder and the copper material if it is left under high temperatures, thereby increasing the electrical resistance.

Since this intermetallic compound is one generated from copper diffusing in the metal components of the solder and has a hard, fragile and rough structure, reduction of soldering joint strength and reduction of electrical conduction occur. These type of problems cannot be resolved with the solder composition disclosed in each of the gazettes described above.

The present invention is one that is devised with the problems described above taken into consideration, and the objective thereof is a solder that is preferable for use in electronic devices and electronic components. In particular, it aims to provide a solder not containing lead with zinc as a dominant element, and a joint not containing lead, which have stable electrical characteristics that are given by controlling the growth of intermetallic compounds at the junctions with the copper.

DISCLOSURE OF INVENTION

The following configuration is provided as an example of a means for achieving the objectives and solving the above-mentioned problems. Namely, a lead-free solder according to the present invention includes, for example, the following configuration. Namely, the lead-free solder contains zinc and tin, and also contains 5 weight percent or less nickel with a liquid phase temperature of 260° C. or greater.

Furthermore, a lead-free solder according to the present invention includes the following configuration. Namely, the lead-free solder has a liquid phase temperature of 260° C. or greater, and contains 30 to 70 weight percent zinc, 5 weight percent or less nickel and the remaining weight percent tin.

Moreover, the present invention includes the following configuration. Namely, a lead-free solder contains zinc and tin, and also contains 5 weight percent or less nickel and 0.5 weight percent or less aluminum with a liquid phase temperature of 260° C. or greater.

Furthermore, a lead-free solder according to the present invention includes the following configuration. Namely, the lead-free solder contains zinc and tin, and also contains 1 weight percent or less copper with a liquid phase temperature of 260° C. or greater.

A lead-free solder according to the present invention further includes the following configuration. Namely, a lead-free solder containing zinc and tin, wherein the content ratio of zinc and tin is set so that the temperature difference between a solid phase temperature and a liquid phase temperature is at least 60° C.

As another means for achieving the objective given above, the present invention includes the following configuration. Namely, a lead-free joint contains zinc and tin, and also contains 5 weight percent or less nickel.

Furthermore, a lead-free joint according to the present invention contains 30 to 70 weight percent zinc, 5 weight percent or less nickel, and the remaining weight percent tin.

Moreover, the present invention includes the following configuration. Namely, a lead-free joint contains zinc and tin, and also contains 5 weight percent or less nickel and 0.5 weight percent or less aluminum.

A lead-free joint according to the present invention further contains zinc and tin, wherein the content ratio of zinc and tin is set so that the temperature difference between a solid phase temperature and a liquid phase temperature is at least 60° C.

For example, the lead-free joint according to the present invention is used in copper connections.

BEST MODE FOR CARRYING OUT THE INVENTION

Figure 1:
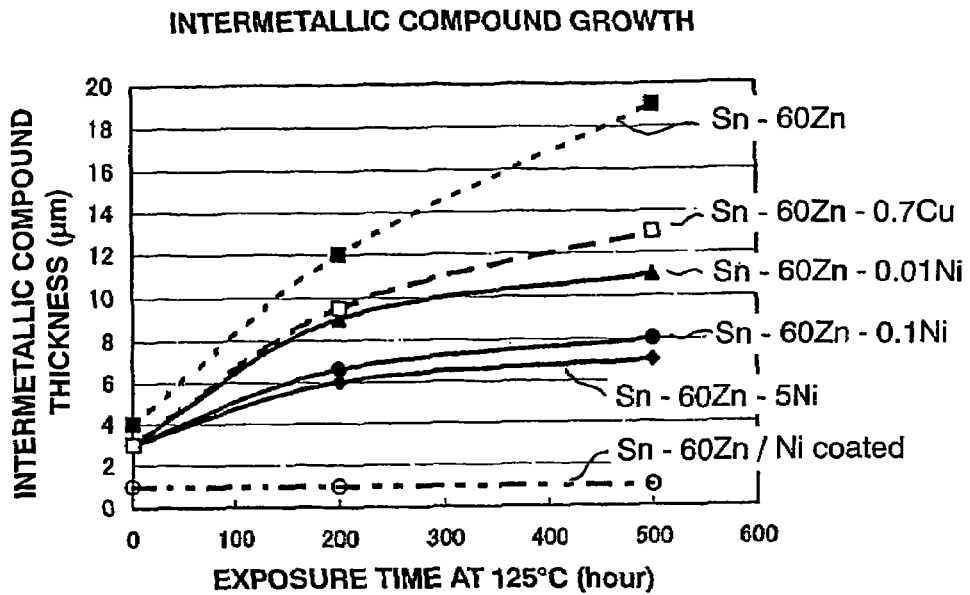
FIG. 1 is a graph illustrating the growth of an intermetallic compound in a solder or the like according to an embodiment of the present invention.

An embodiment according to the present invention is described in detail forthwith while referencing accompanied drawings and tables. As described above, since soldering electronic components onto a printed circuit board is normally performed at a temperature of approximately 260° C., the lead-free high temperature solder, for example, utilized in order to secure the joints of the internal elements or the like of the electronic components mounted upon the board under these conditions must be a high temperature solder with a melting point of 260° C. or greater.

Furthermore, the lead-free high temperature solder must not utilize lead as its metal composition, and must be configured with components that control generation of intermetallic compounds. In addition, the solder utilized for electrical connections in electronic components and electrical devices must be configured with material that has a low electrical resistance value and high conductivity.

Consequently, a solder with a high percentage of zinc is designed in this embodiment by considering the fact that, compared to the specific resistance of tin being 20.648 $\mu\Omega\cdot$cm (20° C.), zinc has a resistance of 5.916 $\mu\Omega\cdot$cm (20° C.), a melting point of 419° C., and high conductivity, which is an important feature for joints of electronic components, and is distinctly an inexpensive metallic material.

Furthermore, the fact that zinc is an indispensable nutritional element for humans, and that the required daily amount for adult men and women as well as the acceptable daily intake has been determined (or example, see the Chemical Substances Safety Evaluation Sheet) have been taken into account.

On the other hand, tin is known not to affect the human body, where with this embodiment, focusing on zinc and tin (with a melting point of 231° C.), solder made of metal components that allow reduction in affects to the human body is proposed.

Inventors repeatedly performed tests and trial production, while fulfilling the conditions described above, in order to find a suitable metal composition not containing lead, and verified whether the obtained samples can be applied to the high temperature solder. In the tests, metal alloys containing tin and zinc as a main component with the varied content ratio of tin and zinc are obtained, and properties with respect to a solid phase temperature and a liquid phase temperature of these alloys are primarily verified.

As a result, tin-zinc alloy configured of 20 to 70 weight percent zinc and the remaining weight percent tin has a fixed solid phase temperature of about 200° C. In the case of the alloy containing 20 weight percent zinc, it is verified that a liquid phase temperature is about 260° C., which rises when the ratio of zinc is further increased.

In other words, by setting the content ratio of tin and zinc so that the temperature difference between the solid phase and liquid phase temperature is at least 60° C., requirement for the high temperature solder can be fulfilled where the solder is durable to the temperature or the like when mounting components onto a printed circuit board.

Conditions mentioned above are a fundamental requirement for the present invention.

Inventors focused attention on adding nickel to the above-mentioned tin-zinc alloy as a means for dealing with problems that intermetallic compounds generate and the resistance value rises at soldering places. The content ratio of the solder made of tin, zinc, and nickel as the main components is then varied so as to perform characteristic tests thereof.

More specifically, tests are performed for lead-free solder configured of 30 to 70 weight percent zinc, 0.01 to 5 weight percent nickel, and the remaining weight percent tin. It should be noted that in the case where the ratio of zinc is under 30 weight percent, the solder liquid phase temperature may not be maintained at 260° C. or greater, and is thus not suitable for the high temperature solder used within the internal configuration of electronic components. Furthermore, in the case where the ratio of zinc exceeds 70 weight percent, there are problems of rising liquid phase temperatures, increasing hardness, and complicating workability of the solder.

Table 1 shows the results of measuring the resistance value of solder when the compositional ratio of zinc is varied. The test sample is a thread solder of length 30 cm with a 1.6 mm diameter, where ten samples of the respective compositional ratios are measured and the average value thereof is then calculated.

TABLE 1

| Sample No. | Composition [wt %] | Resistance Value [Ω] |
| --- | --- | --- |
| 1 | Sn.30Zn.2Ni | 14.5 |
| 2 | Sn.40Zn.2Ni | 13.8 |
| 3 | Sn.50Zn.2Ni | 12.5 |
| 4 | Sn.60Zn.2Ni | 11.6 |
| 5 | Sn.70Zn.2Ni | 10.4 |
| 6 | Sn.90Pb | 27.0 |

As is apparent from the results given in Table 1, since the resistance value of the solder according to this embodiment is at most half the resistance value of the conventional solder (Sample No. 6) made of tin and 90 weight percent lead, it sufficiently contributes to the demand for maintaining high conductivity. It should be noted that from the viewpoint of liquid phase temperature, workability and the like, the optimum compositional ratio of the tin-zinc-nickel solder is 40 to 60 weight percent zinc, 1 to 3 weight percent nickel, and the remaining weight percent tin.

Next, the intermetallic compound mentioned above is described. For example, in the case of soldering onto copper or a copper alloy a solder made of zinc and tin, due to copper diffusing into zinc under such environmental conditions as exposure under high temperatures of 100° C. or greater, an intermetallic compound of the zinc and copper may generate on the joint interface of the zinc and copper. As a result, the electrical resistance at the soldering places increases.

Since copper material is typically used for maintaining conductivity in electronic devices and electronic components, minimizing the increase in electrical resistance due to generation of such intermetallic compounds is necessary from the viewpoint of assuring reliability and performance of devices and the like.

FIG. 1 is a graph showing the intermetallic compound growth over time when samples of tinned copperplate are soldered with a solder containing tin and 60 wt % zinc (■ symbol in the drawing), a solder containing tin, 60 wt % zinc, and 0.01 wt % nickel (▲ symbol in the drawing), a solder containing tin, 60 wt % zinc, and 0.1 wt % nickel (● symbol in the drawing), and a solder containing tin, 60 wt % zinc, and 5 wt % nickel (◇ symbol in the drawing), and samples of 2 μm-thick tinned copperplate undercoated with nickel are soldered with a solder containing tin and 60 wt % zinc (○ symbol in the drawing) and a solder containing tin, 60 wt % zinc and 0.7 wt % copper (□ symbol in the drawing) when exposed under the condition of 125° C.

It can be understood from the test results given in FIG. 1 that with a nickel undercoated copperplate, the growth (generated thickness) of the intermetallic compound is approximately 1 μm, which has little affect on changes in the resistance value. This means that nickel plating is utmost effective in controlling intermetallic compound growth.

Furthermore, it can be understood from FIG. 1 that in the case of the nickel-added solder, the growth of intermetallic compounds is controlled in comparison to solder without nickel added thereto. It is preferable that the amount of nickel to be added be 0.01 to 5 weight percent, which allows the intermetallic compound growth to be less than half. However, as long as nickel is added thereto, even if it is less than 0.01 weight percent, there is the effect of controlling the intermetallic compound growth.

Figure 3:
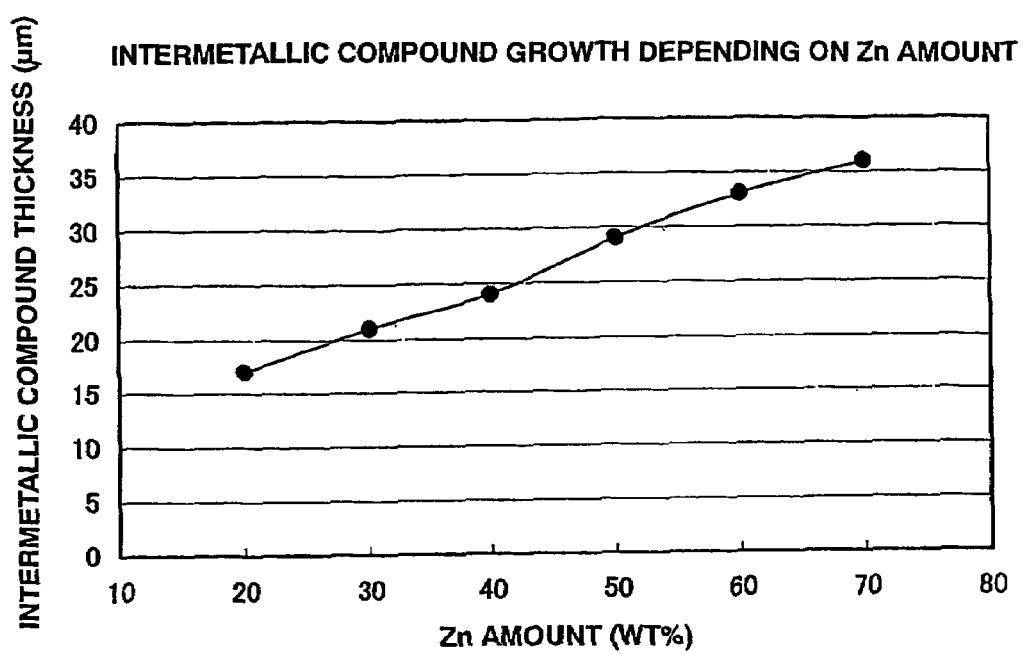
FIG. 3 is a graph showing differences in growth of the intermetallic compound due to differences in zinc content.

FIG. 3 shows differences in intermetallic compound growth in the case where a Sn—Zn solder with varied zinc content is soldered to a copperplate and exposed for 1000 hours under the condition of 125° C. According to the drawing, it is understood that the thickness of the intermetallic compound to be generated increases as the amount of zinc increases. Accordingly, increasing the nickel content amount proportional to the content amount of zinc is effective to control intermetallic compound growth, and the ratio of the amount of nickel to zinc is preferably at least 0.16 weight percent.

It should be noted that even in the case of adding 0.1 to 1 weight percent of copper instead of the nickel, the same control effect for the intermetallic compound is obtained as when nickel is added thereto. In this manner, the solder containing nickel or copper makes it unnecessary for the copper material to be already undercoated with nickel.

On one hand, it has been verified that adding 5 weight percent nickel improves solder wettability and generates fluidity. This improvement in wettability is an advantage (improvement in solderability) for zinc-type solders, however, since solders move in a solid- liquid coexistent state, fluidity is cause for changing joint form due to reheating in the manufacturing process of electronic devices and electronic components. Consequently, the upper limit for the added amount of nickel is 5 wt %, for example.

It should be noted that joints, for example, maintain connections in electronic devices and electronic components between each part, such as an element and an electrode having predetermined electrical characteristics, an electrode of an electronic component and a wiring pattern on a printed circuit board, or the like.

As a joint formation method of the present invention, the joints of the elements and electrodes may be configured using the solder pre-set with the solder compositional ratio established according to the present invention, or it may be one where joints fulfilling the compositional ratio indicated by the solder according to the present invention are configured as a result from melting and mixing, for example, a first solder containing tin and zinc, and a second solder containing nickel and aluminum when connecting and fixing together the element portions and electrode portions.

With this embodiment, 0.01 weight percent aluminum is then further added to the intermetallic compound, which is made of the metal components tin, zinc, and nickel as a measure for the fluidity described above. As a result, change in joint form is prevented through improvement in fluidity.

Table 2 shows the rate of change in the resistance value in the case where aluminum is added to solder material made of the metal components tin, zinc, and nickel. The data given in Table 2 is test results of resistance value variations where a tinned copper land pattern of 2 mm squares with a 5 mm pitch is formed upon a printed circuit board, and a 100 μm silver plated copper wire is crossed and fixed to that pattern with solders made of each of the metallic compositions given in the table, when it is exposed to 125° C. for 500 hours.

TABLE 2

| Sample No. | Composition [wt %] | Rate of Change in Resistance Value [%] |
| --- | --- | --- |
| 1 | Sn.60Zn.2Ni | 1.1 |
| 2 | Sn.60Zn.2Ni.0.01Al | 1.6 |
| 3 | Sn.60Zn.2Ni.0.5Al | 1.9 |
| 4 | Sn.60Zn.2Ni.1Al | 3.3 |

As shown in Table 2, it is understood that adding aluminum to a solder made of tin, zinc and nickel increases the rate of change in its resistance value (it is particularly noticeable in the case of the composition of Sample No.4). This emanates from oxidation of the aluminum, where the ultimate addition of aluminum is an effective means for the fluidity of solder, while increasing the aluminum increases the rate of change in its resistance value, thereby the appropriate upper limit of aluminum to be added is 0.5 weight percent. Accordingly, the added amount may be chosen within this range in conformity with the aspect of utilizing the solder not containing lead according to the present invention.

It should be noted that aluminum does not have to be added to a solder when utilizing in an allowable fluidity, however, adding at least 0.01 weight percent is preferable for convenience of handling the solder.

Figure 2:
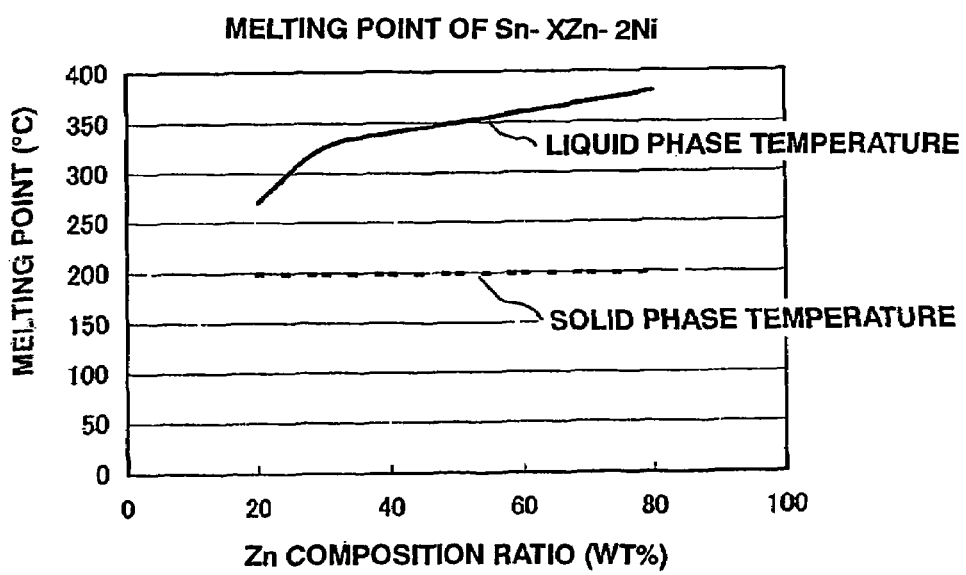
FIG. 2 is a graph showing melting points of solder that contains tin, zinc, and nickel in the case where the ratio of zinc is varied.

FIG. 2 shows the melting point of a solder that contains tin, zinc, and nickel (2 weight percent) in cases of varied ratios of zinc. According to the drawing, in the case where the compositional ratio of zinc is 30 weight percent, the solid phase temperature of the solder is 199° C. and the liquid phase temperature is 325° C., where the liquid phase temperature rises as the ratio of zinc increases. It should be noted that the added amount of nickel or aluminum according to the scope of the present invention indicates solid phase temperatures and liquid phase temperatures almost equivalent to those in FIG. 2, whereby the solder according to the embodiment of the present invention is clearly fulfilling the requirement for the fluid phase temperature of 260° C. or greater.

Furthermore, in the case where the compositional ratio of zinc is 70 weight percent, the liquid phase temperature is approximately 370° C., which is sufficient for use in electronic devices and electronic components.

Furthermore, a characteristic property of the solder according to this embodiment is that it stays in a solid-liquid coexistent state between the solid phase temperature and liquid phase temperature, which holds the characteristics given below. Namely, it is verified as a result of the tests that between the solid phase temperature and liquid phase temperature the solder is in a solid-liquid coexistent state with roughly a sherbet consistency in which wettability is low and the soldered area does not spread. As a result, the shape of the joint formed using the solder according to this embodiment is maintained even if exposed under a temperature between the solid phase temperature and liquid phase temperature, which is maintained by heating such as reflowing. If the temperature drops, the solder condenses once again, whereby the connection state of the joint does not change.

It should be noted that the lead-free solder described above is not only applicable when utilized for the joining method where a necessary amount is provided at joining places of junction targets and then melted so as to join therebetween, but also when with the lead-free solder is kept in a molten state for a long time period, the junction targets are soaked in the lead-free solder in this molten state so as to be joined together.

As described above, a solder not containing lead having excellent characteristics but not having any harmful effects to the environment due to harmful substances, and a joint not containing lead are provided according to the present invention.

Namely, the same low price as the solder containing lead can be maintained by making the solder have a metal composition of tin and zinc without containing harmful substances such as lead, and solder fluidity can be improved by adding nickel to such tin-zinc alloy. In addition, by making the solder have a metal composition of tin and zinc, processing the solder becomes easier even when a thread solder or a foil solder is necessary for manufacturing electronic devices or components.

Furthermore, a high temperature solder not containing lead can be provided where since solderability improves due to improvements in solder fluidity, the connected state of the soldered joints can be satisfactorily maintained, and soldering does not have adverse effects on the electronic components.

Moreover, adding aluminum for example, 0.01 weight percent) to the metal alloy made of the metal components tin, zinc, and nickel allows improvement in solder heat resistance and fluidity, and as a result, preventing increases in electrical resistance due to intermetallic compounds and changes in solder joint form due to reheating.

It should be noted that the composition of the solder not containing lead and the joint not containing lead according to the present invention may include unavoidable impurities, other than substances described above as components comprising the present invention. For these unavoidable impurities, descriptions of JIS Z3282:1999 and ISO9453:1990 provided respectively by the Japanese Industrial Standards (JIS) and International Organization for Standardization (ISO) serve as a reference. The composition of the solder does not depart from the scope of the claims of the present invention even when containing such unavoidable impurities.

While the invention has been described with reference to particular example embodiments, further modifications and improvements which will occur to those skilled in the art, may be made within the purview of the appended claims, without departing from the scope of the invention in its broader aspect.

INDUSTRIAL APPLICABILITY

The present invention has been described in detail thus far. It provides a solder not containing lead and a joint not containing lead having excellent characteristics but not including any harmful substances.

The present invention provides a high temperature solder not containing lead where since solderability improves due to improvements in solder fluidity, the connected state of the soldered joints can be satisfactorily maintained, and soldering does not have adverse effects on the electronic components. In addition, the solder of the present invention provides improvement in solder heat resistance and fluidity which prevents increases in electrical resistance due to intermetallic compounds and changes in solder joint form due to reheating.

The invention claimed is:

1. A lead-free solder, which contains 30 to 70 weight percent zinc, greater than 0 to 5 weight percent nickel, and the remaining weight percent tin with a liquid phase temperature of 260° C. or greater, wherein the ratio of the amount of said nickel to said zinc is at least 0.16 weight percent.

2. A lead-free joint, which contains 30 to 70 weight percent zinc, greater than 0 to 5 weight percent nickel, and the remaining weight percent tin, wherein the ratio of the amount of said nickel to said zinc is at least 0.16 weight percent.

* * * * *